US011879614B2

(12) United States Patent
Deko

(10) Patent No.: US 11,879,614 B2
(45) Date of Patent: Jan. 23, 2024

(54) RECHARGEABLE ILLUMINATING PERSONAL ORNAMENTS AND LUMINAIRES

(71) Applicant: Eleftheria Deko, Athens (GR)

(72) Inventor: Eleftheria Deko, Athens (GR)

( * ) Notice: Subject to any disclaimer, the term of this patent is extended or adjusted under 35 U.S.C. 154(b) by 0 days.

(21) Appl. No.: 17/257,518

(22) PCT Filed: Jul. 3, 2018

(86) PCT No.: PCT/EP2018/067918

§ 371 (c)(1),
(2) Date: Dec. 31, 2020

(87) PCT Pub. No.: WO2020/007449

PCT Pub. Date: Jan. 9, 2020

(65) Prior Publication Data

US 2021/0180758 A1 Jun. 17, 2021

(51) Int. Cl.

| | |
|---|---|
| ***F21S 9/02*** | (2006.01) |
| ***A44C 15/00*** | (2006.01) |
| ***F21S 6/00*** | (2006.01) |
| ***F21V 23/04*** | (2006.01) |
| ***F21V 23/06*** | (2006.01) |

(Continued)

(52) U.S. Cl.
CPC ............ *F21S 9/02* (2013.01); *A44C 15/0015* (2013.01); *F21S 6/003* (2013.01); *F21V 23/04* (2013.01); *F21V 23/06* (2013.01); *F21W 2121/06* (2013.01); *F21Y 2115/10* (2016.08)

(58) Field of Classification Search
CPC ......... A44C 15/0015; F21S 9/02; G08B 5/36; G06F 1/163; H02J 7/0013; H02J 7/0027; H02J 7/0042; H02J 7/0044; H02J 7/02; H02J 7/025; H02J 50/10; H02J 50/005; F21L 4/08
See application file for complete search history.

(56) References Cited

U.S. PATENT DOCUMENTS 4,101,955 A * 7/1978 DuNah .............. A44C 15/0015 63/18
4,605,993 A * 8/1986 Zelina, Jr. ................. F21S 9/02 362/183

(Continued)

FOREIGN PATENT DOCUMENTS

| | | | |
|---|---|---|---|
| EP | 1052917 | A1 | 11/2000 |
| WO | WO 2015/081321 | A1 | 6/2015 |
| WO | WO 2017/156633 | A1 | 9/2017 |

*Primary Examiner* — Peggy A Neils
*Assistant Examiner* — James M Endo
(74) *Attorney, Agent, or Firm* — DP IP GROUP; Franco S. De Liguori

(57) ABSTRACT

Luminaires including a charging base and a rechargeable illuminating personal ornament. The charging base includes a power cable connectable to an external power source and a power connector. The rechargeable illuminating personal ornament is connected to the charging base and has a shell, a light source attached to the shell, a rechargeable power source located in the shell and connected to the light source, and a corresponding power connector defining an opening in the shell and coupled to the rechargeable power source. The power connector of the charging base is coupled to the corresponding power connector of the rechargeable illuminating personal ornament.

23 Claims, 7 Drawing Sheets

(51) Int. Cl.
*F21Y 115/10* (2016.01)
*F21W 121/06* (2006.01)

(56) References Cited

U.S. PATENT DOCUMENTS

| | | | | | |
|---|---|---|---|---|---|
| 4,930,052 | A * | 5/1990 | Beige | F21L 2/00 | 362/104 |
| 5,497,307 | A * | 3/1996 | Bae | A44C 15/0015 | 362/802 |
| 6,433,483 | B1 * | 8/2002 | Michael | A44C 15/0015 | 315/307 |
| 6,659,617 | B1 * | 12/2003 | Michael | A44C 15/0015 | 362/571 |
| 6,663,256 | B1 * | 12/2003 | Gobbell | A44C 7/00 | 362/108 |
| 7,934,849 | B2 * | 5/2011 | Ellis | F21S 6/00 | 362/183 |
| 8,985,791 | B1 * | 3/2015 | Hinzmann | F21L 4/027 | 362/2 |
| 9,133,994 | B2 * | 9/2015 | Dowdy | H05B 47/175 | |
| 9,438,984 | B1 * | 9/2016 | Ryann | H04R 5/0335 | |
| 9,456,063 | B2 * | 9/2016 | Mercando | H02J 7/0042 | |
| 10,617,023 | B2 * | 4/2020 | Lin | H02J 7/0047 | |
| 2001/0055207 | A1 * | 12/2001 | Barbeau | H02J 9/02 | 362/194 |
| 2007/0223217 | A1 * | 9/2007 | Hsu | F21V 23/02 | 362/183 |
| 2007/0291475 | A1 * | 12/2007 | Heathcock | F21S 9/02 | 362/157 |
| 2009/0154148 | A1 * | 6/2009 | Meyer | F21S 6/005 | 315/86 |
| 2010/0124050 | A1 * | 5/2010 | Hau | F21V 23/04 | 362/183 |
| 2011/0001455 | A1 * | 1/2011 | Dowdy | F21S 9/02 | 320/107 |
| 2011/0194276 | A1 * | 8/2011 | Au | A44C 15/0015 | 362/104 |
| 2012/0256540 | A1 * | 10/2012 | Batty | H05B 47/16 | 315/33 |
| 2013/0074543 | A1 | 3/2013 | Vahid | | |
| 2013/0194789 | A1 * | 8/2013 | Vargas | F21V 33/0004 | 362/183 |
| 2014/0042962 | A1 * | 2/2014 | Thompson | H02J 7/0013 | 320/107 |
| 2015/0009654 | A1 * | 1/2015 | Chan | H05B 45/20 | 362/104 |
| 2015/0164188 | A1 * | 6/2015 | Gelfand | A44C 15/0015 | 63/1.13 |
| 2015/0223576 | A1 * | 8/2015 | Vora | A44C 15/0015 | 362/104 |
| 2015/0334810 | A1 * | 11/2015 | Tsang | A44C 25/001 | 315/33 |
| 2016/0104355 | A1 | 4/2016 | Alexander et al. | | |
| 2016/0366738 | A1 * | 12/2016 | Boulanger | F21V 21/02 | |
| 2017/0045186 | A1 * | 2/2017 | Wong | F21V 21/06 | |
| 2017/0065039 | A1 * | 3/2017 | Takeuchi | A44C 5/0007 | |
| 2017/0108197 | A1 * | 4/2017 | Cacciabeve | F21V 5/04 | |
| 2017/0310160 | A1 * | 10/2017 | Wan | F21V 3/062 | |
| 2018/0098404 | A1 * | 4/2018 | Hall | H05B 47/19 | |
| 2018/0368223 | A1 * | 12/2018 | Johnson | H02J 7/0047 | |

* cited by examiner

RECHARGEABLE ILLUMINATING PERSONAL ORNAMENTS AND LUMINAIRES

The present disclosure relates to rechargeable illuminating personal ornaments and luminaires employing said rechargeable illuminating personal ornaments

BACKGROUND

Luminaires are electrical devices used to create artificial light by use of an electric lamp.

Personal ornaments, also collectively called "jewelry", consist of small decorative items worn for personal adornment, such as brooches, rings, necklaces, earrings, pendants and bracelets.

Typically jewelry is stored in boxes and organizers. Such jewelry boxes and organisers are typically used for storage and display and occupy space with no further purpose in a home environment.

Some jewelry stands, holders or organisers exist for commercial display of jewelry. They typically have pockets or holes to receive pieces of jewelry, e.g. earrings, for decorative or demonstration purposes.

SUMMARY

New types of luminaires and personal ornaments are proposed. The personal ornaments may comprise a light source and a rechargeable power source and may be worn as illuminating ornaments. When not worn, they may be placed on a charging base to charge and at the same time form a luminaire.

In a first aspect, a luminaire is proposed. The luminaire comprises a charging base. The charging base comprises a power cable connectable to an external power source and a power connector. The luminaire further comprises a rechargeable illuminating personal ornament, connected to the charging base. The rechargeable illuminating personal ornament comprises a shell, a light source attached to the shell, a rechargeable power source, located in the shell and connected to the light source and a corresponding power connector, defining an opening in the shell and coupled to the rechargeable power source. The power connector of the charging base is coupled to the corresponding power connector of the rechargeable illuminating personal ornament.

The ornaments may be made of metal and of a semi-transparent polymer. The ornaments may be self-luminous using light emitting diodes (LEDs) of the Red-Green-Blue (RGB) type or of the Warm White (WW) or Cold White (CW) type. They may be rechargeable either through a wired or wireless connection. The base along with the ornaments may form a decorative lighting object. The base may comprise a controller. The controller may include a processor, a data storage coupled to the processor and an instruction set. The instruction set may cooperate with the processor and the data storage to control the luminance of the ornaments through an asynchronous serial communication. The base may comprise a button or a switch to switch on, switch off or control dimming of the ornaments' light while the ornaments are placed on the base and when the ornaments and base form a lighting ensemble. The base may be made of metal and may have additional decorative elements, e.g. of wood.

By using rechargeable illuminating personal ornaments as lighting elements of the luminaire, three functionalities may be achieved at the same time: First, a stand or holder for the ornaments is provided. Second, a recharging base for the illuminating ornaments is provided. And third, light may be produced while the ornaments are recharging.

In some examples, the luminaire may further comprise a power button. Thus the light effect during recharging may be selectable either on the charging base and/or on the rechargeable illuminating personal ornament. The term "power button" is used here to denote any type of switchable element that may alter a conductive state from on to off and vice versa.

In some examples, the charging base may comprise a plurality of charging points. Each charging point may comprise a power connector for receiving a corresponding power connector of a rechargeable illuminating personal ornament. Thus various rechargeable illuminating personal ornaments may be placed on the charging base to be recharged and/or serve as lighting elements of the luminaire. Furthermore, the luminaire may still provide light even if one or more of the rechargeable illuminating personal ornaments is off the charging base or simply switched off.

The base may be powered through a 100-240 Vac mains power source. Then, through a power supply, voltage may be provided to the individual electronic devices. The base may be linked to the jewelry through a pair of contacts for each jewel.

In some examples the rechargeable power source may comprise a rechargeable battery, such as a lithium-ion battery. This allows for multiple recharges of the battery with minimum loss in capacity. The rechargeable power source may also be replaceable.

The rechargeable illuminating personal ornament may comprise one or more of a brooch, a ring, a necklace, an earring, a pendant and a bracelet. The charging base may be either of a generic base, suitable to recharge any of the above ornaments provided that they have the same type of power connector, or may be specific to particular types or even models of ornaments. For example, the shape of the charging base may match a shape of the shell of the ornament allowing only ornaments with a matching shape to couple to the charging base.

The light source of the rechargeable illuminating personal ornaments may comprise one or more light emitting diodes (LEDs). LEDs provide light without heating up too much thus remaining comfortable when placed on personal ornaments that may be on or very near a person's body part. However, other types of light sources may be used.

In some examples, the power connector may be a Universal Serial Bus (USB) connector. Thus a charging base may also serve for charging other devices. Furthermore, third party ornaments may also be used with the charging base. Furthermore, the ornaments may be recharged by common USB type rechargers even without the presence of the charging base. For that purpose the power connector may be a USB plug connector and the corresponding power connector may be a USB receptacle connector or vice versa. In other examples, the charging of the ornaments may be performed wirelessly, e.g. using induction coils.

In some examples, the luminaire may comprise a desk luminaire. As such, the luminaire may comprise a base to stand on a desk and a power cord to be connected to a wall outlet. The desk luminaire may thus be used as a common desk lamp when the ornaments are placed on the charging base and the luminaire is switched on.

In another aspect, a rechargeable illuminating personal ornament is disclosed. The rechargeable illuminating personal ornament may comprise a shell; a light source attached to the shell; a rechargeable power source, located in the shell and connected to the light source; and a power connector, defining an opening in the shell to receive power from a corresponding power connector of a charging base.

The ornaments may be connected to the base through a pair of contact pins. Polarity may not matter because the ornament may comprise a rectifier bridge through which the output polarity may be set. A charger block may be connected to a battery, e.g. a Polymer Lithium Ion battery, that may charge the battery as long as the ornament is attached to the base or it may supply power to the ornament through the battery when it is disconnected from the base.

The rechargeable illuminating personal ornament may comprise a brooch, a ring, a necklace, an earring, a pendant or a bracelet. Thus, the shell may accordingly comprise pins, clips, or any other attachment means for attaching to a part of the body, e.g. ear, nose, finger etc. or to a garment worn on the body of a user.

In yet another aspect, a charging base for a luminaire is disclosed. The charging base may comprise one or more charging stations for rechargeable illuminating personal ornaments. Each charging station may comprise a power connector to receive a corresponding power connector of a rechargeable illuminating personal ornament.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1A:
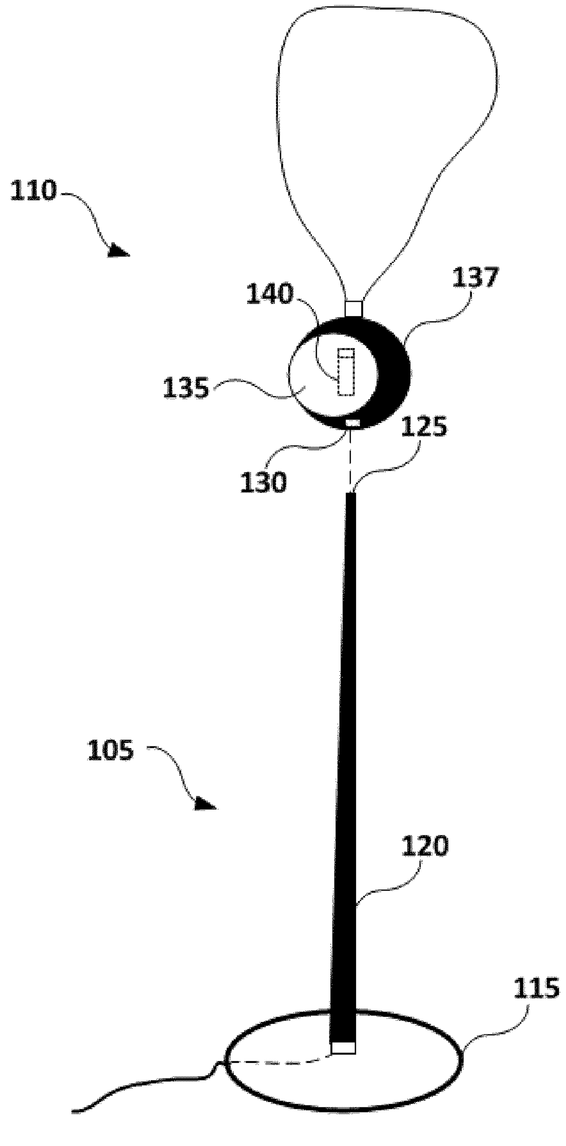
FIGS. 1A and 1B schematically illustrate a luminaire according to an example.
Figure 1B:
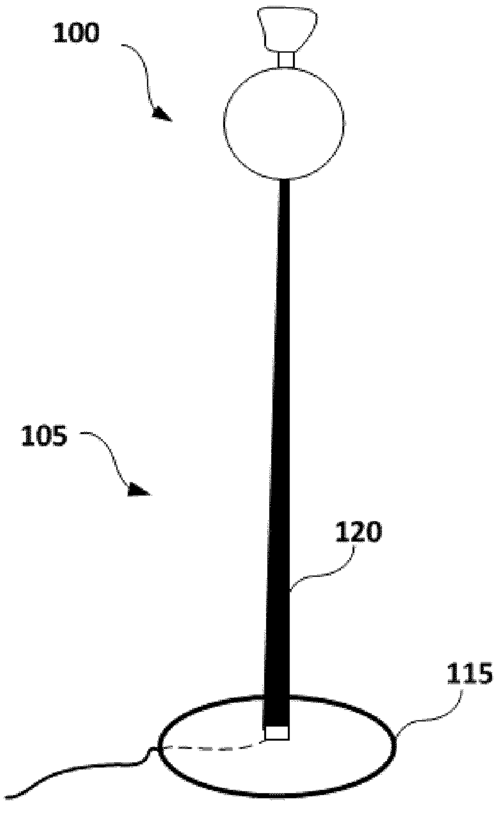

FIG. 1A schematically illustrates a rechargeable illuminating personal ornament and a charging base according to an example. FIG. 1B schematically illustrates a luminaire formed by the rechargeable illuminating personal ornament and the charging base of FIG. 1A. Luminaire 100 comprises charging base 105 and a rechargeable illuminating personal ornament 110 coupled to the charging base 105. The charging base 105 comprises a base platform 115 and a post 120. The post may be integrated on one edge with the base platform 115 or may be screwable on one edge to the base platform 115. The other edge of the post 120 may comprise a power connector 125. The base platform 115 may provide stability to the luminaire and may also host a power cable reaching all the way to the power connector 125 to provide power to the rechargeable illuminating personal ornament 110 when the rechargeable illuminating personal ornament 110 is on the charging base 105. The rechargeable illuminating personal ornament 110 may comprise a matching power connector 130 to match the power connector 125 of the charging base. Furthermore, the rechargeable illuminating personal ornament 110 may comprise a shell 137, a light source 135 attached to the shell 130, and a rechargeable power source 140, located in the shell 137 and connected to the light source 135 and to the matching power connector 130. The shell may comprise further elements such as pins, clips, chain holders etc. In the example of FIGS. 1A and 1B, the rechargeable illuminating personal ornament 110 is in the form of a pendant. It may thus comprise a clasp or fastener and a chain or cord that may pass through a perforation of the shell. The shell 137 may comprise an aperture or cavity on where the light source 135 may be attached.

Figure 2:
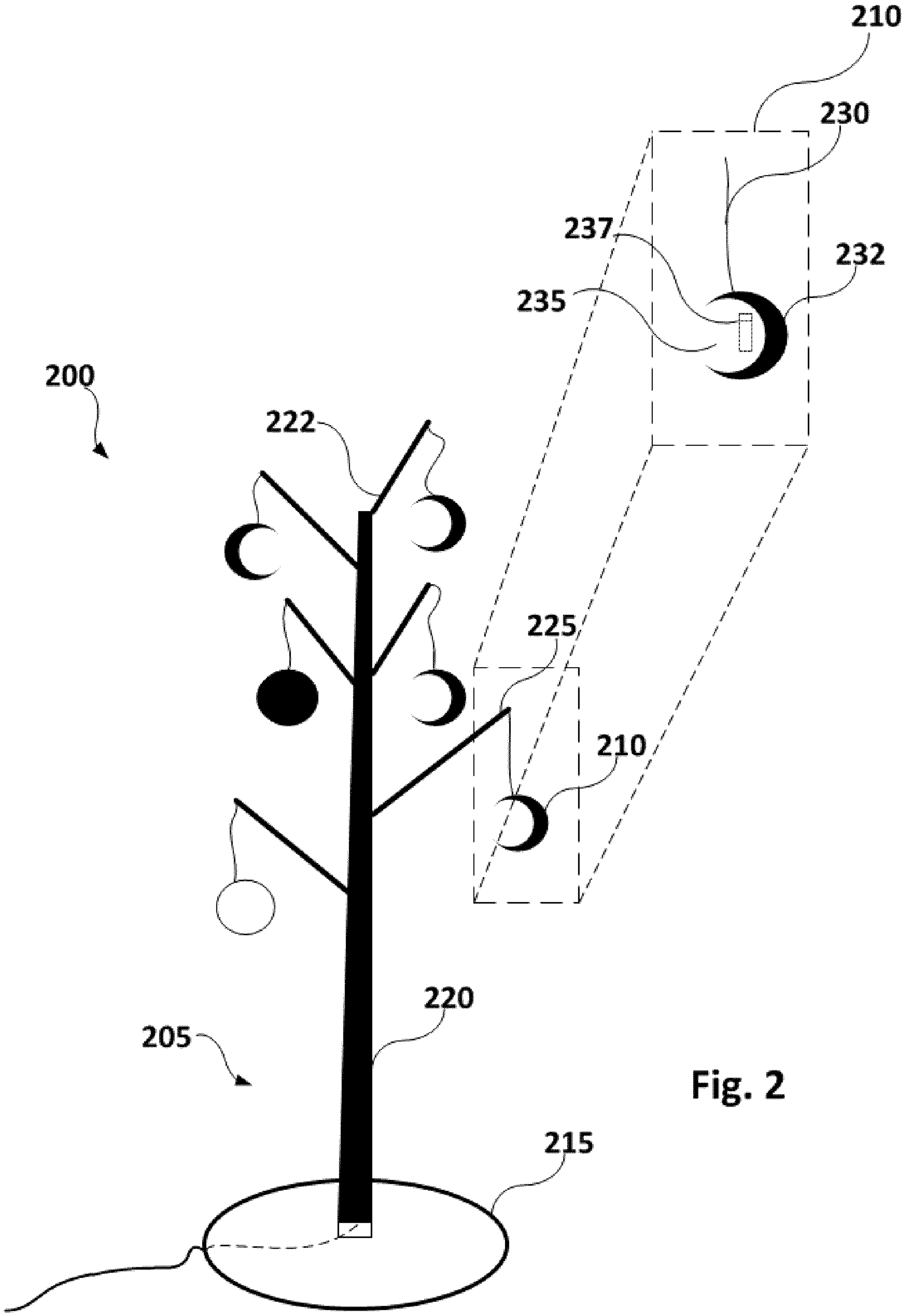
FIG. 2 schematically illustrates a luminaire according to another example.

FIG. 2 schematically illustrates a luminaire according to another example. Luminaire 200 comprises a charging base 205 and a plurality of rechargeable illuminating personal ornaments 210 coupled to the charging base 205. The charging base 205 comprises a base platform 215 and a post 220. The post 220 may be integrated on one edge with the base platform 215 or may be attachable (e.g. screwable) on one edge to the base platform 215. The post 220 may comprise branches 222. Each branch 222 may be integrated on one edge with the post 220 or may be attachable (e.g. screwable) on one edge to the post 220. The other edge of the branch 222 may comprise a power connector 225. The base platform 215 may provide stability to the luminaire and may also host a power cable reaching all the way to the power connectors 225 to provide power to the rechargeable illuminating personal ornaments 210 when the rechargeable illuminating personal ornaments 210 are on the charging base 205. The rechargeable illuminating personal ornaments 210 may comprise a matching power connector 230 to match the power connector 225 of the branches. Furthermore, each rechargeable illuminating personal ornament 210 may comprise a shell 232, a light source 235 attached to the shell 230, and a rechargeable power source 235, located in the shell and connected to the light source 235 and to the matching power connector 230. The shell may comprise further elements such as pins, clips, chain holders etc. In the example of FIG. 2, the rechargeable illuminating personal ornaments 210 are in the form of spherical earrings. They may thus comprise a pin or clasp that may be attached to the shell 232 and may be suitable to be worn on an ear. The shell 232 may comprise an aperture or cavity on where the light source 235 may be attached.

Figure 3:
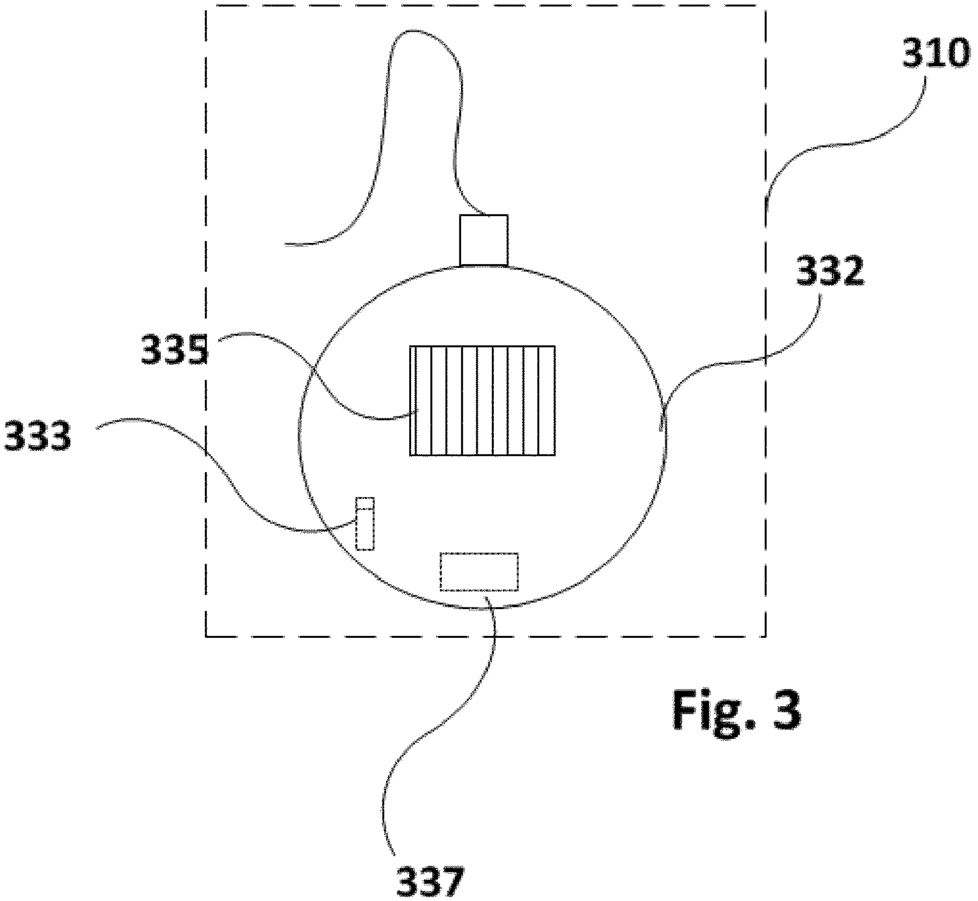
FIG. 3 schematically illustrates a rechargeable illuminating personal ornament according to an example.

FIG. 3 schematically illustrates a rechargeable illuminating personal ornament according to an example. The rechargeable illuminating personal ornament 310 may comprise a shell 332, a light source 335 (e.g. a LED) attached to the shell 332, and a rechargeable power source 333 (e.g. a battery), located in the shell 332 and connected to the light source 335 and to a power connector 337. In the example of FIG. 3, the rechargeable illuminating personal ornament 310 is in the form of a spherical earring.

Figure 4:
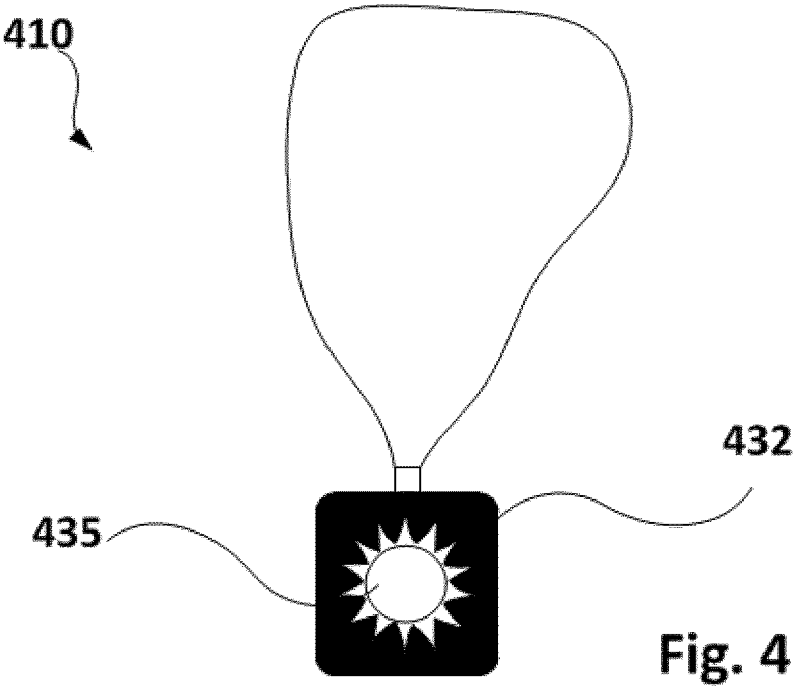
FIG. 4 schematically illustrates a rechargeable illuminating personal ornament according to another example.

FIG. 4 schematically illustrates a rechargeable illuminating personal ornament according to another example. The rechargeable illuminating personal ornament 410 may comprise a shell 432 and a light source 435 (e.g. a LED) attached to the shell 432. In the example of FIG. 4, the rechargeable illuminating personal ornament 410 is in the form of a hexahedral pendant.

Figure 5:
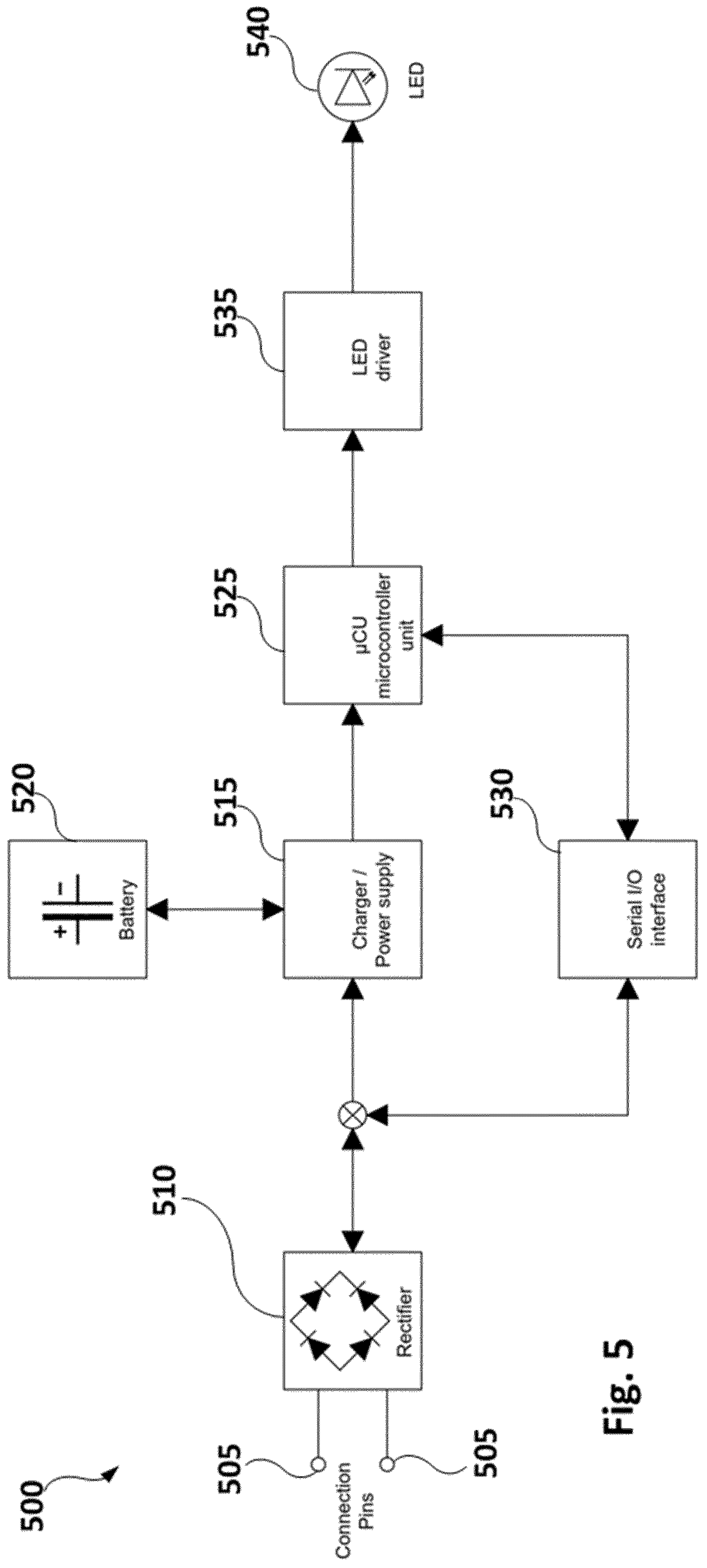
FIG. 5 schematically illustrates an electrical diagram of a rechargeable illuminating personal ornament according to an example.

FIG. 5 schematically illustrates an electrical diagram of a rechargeable illuminating personal ornament according to an example. Personal ornament 500 may comprise a pair of connection pins 505. One end of the pins 505 may be connectable to a power source, e.g. a DC power supply. The other end of the pins 505 may be connected to a voltage rectifier 510. The voltage rectifier may set the polarity of the voltage. Thus the pins 505 may be coupled to the power supply without worrying about the polarity. The personal ornament 500 may further comprise a charger/power supply block 515. The charger 515 may be coupled to the rectifier 510 and to a battery 520, e.g. a Polymer Lithium Ion battery, and may charge the battery as long as the ornament is attached to the base or it may supply power to the ornament through the battery when it is disconnected from the base. A microcontroller (μCU) 525 may be coupled to the charger. A serial I/O interface 530 may be coupled to the μCU 525 and to the output of the rectifier 510. When the ornament is connected to a power source then the block 515 may act as a charger to charge the battery 520. When the ornament is disconnected from the power source then the block 515 may act as a power supply to the μCU 525, the μCU 525 receiving power from the battery 520. The μCU 525 may provide power (either from the power source or from the battery 520) to a LED driver 535 of the ornament 500 and the LED driver 535 may power a LED 540 of the ornament 500.

Figure 6:
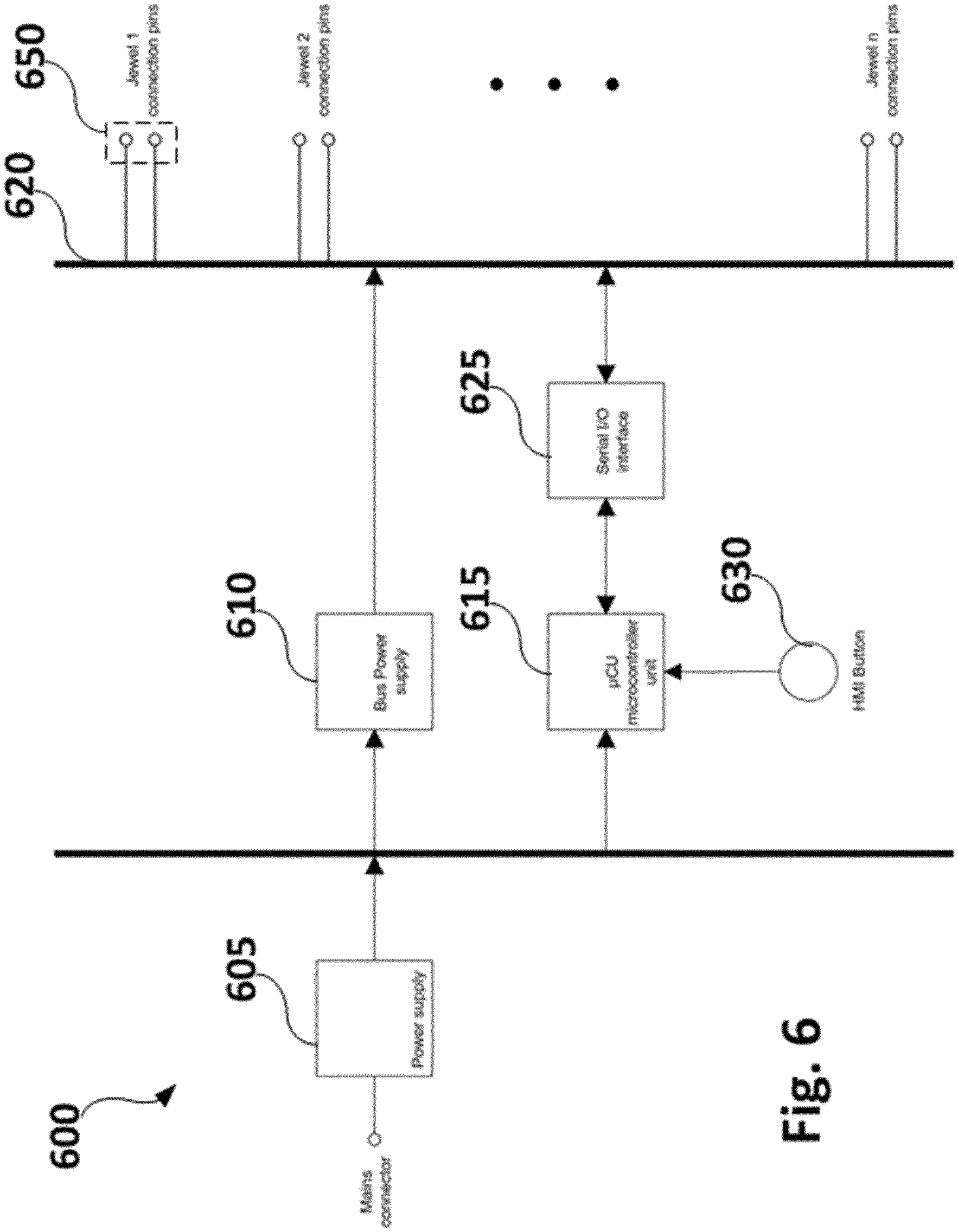
FIG. 6 schematically illustrates an electrical diagram of a charging base for rechargeable illuminating personal ornaments according to an example.

FIG. 6 schematically illustrates an electrical diagram of a charging base for rechargeable illuminating personal ornaments according to an example. The charging base 600 may comprise a power supply 605. The power supply 605 may be connectable to a mains connector. The power supply 605 may provide power to a Bus Power supply 610 and to a μCU 615 of the charging base 600. The Bus Power supply may provide power to ornament connection pin pairs 650 coupled along a power bus 620. The μCU 615 may be coupled to a Human Machine Interface (HMI) button switch 630 to control power supplied to the ornament pin pairs (and thus control brightness of any ornaments coupled to the pin pairs 650). A Serial I/O interface 625 may be coupled between the μCU 615 and the power bus 620. The HMI button switch 630 may be coupled to the μCU and may be Normally Open (N.O). The input may be encoded and asynchronously—serially sent to the Serial I/O interface 625. The Serial I/O interface 625 is essentially a transistor connected to the jewelry feed bus with a common emitter—open collector configuration. The transistor may be connected to a Pull-up resistor located at the bus power supply. The bus power supply generates the voltage that supplies the jewelry (i.e. the ornaments) for charging and provides them with voltage through the pullup resistor to make the communication between the jewels and the base, and vice versa, possible.

Figure 7:
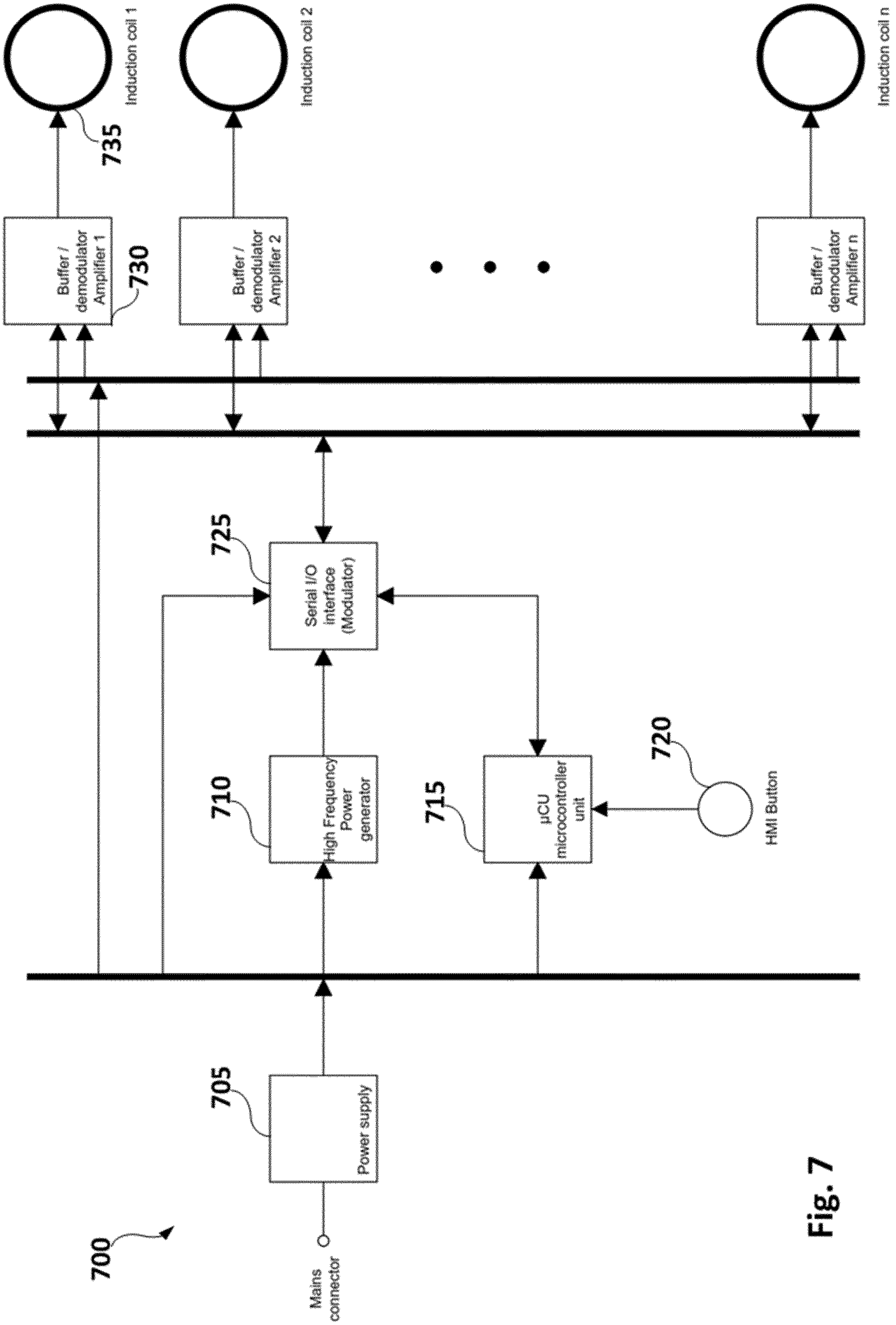
FIG. 7 schematically illustrates an electrical diagram of a wireless charging base for rechargeable illuminating personal ornaments according to an example.

FIG. 7 schematically illustrates an electrical diagram of a wireless charging base for rechargeable illuminating personal ornaments according to an example. The charging base 700 may comprise a power supply 705. The power supply 605 may be connectable to a mains power source, e.g. a 100-240V AC mains power source. The power supply 705 may provide power to a high frequency power generator 710, to a μCU 715, to a serial I/O interface (modulator) 720 and to buffers/demodulator amplifier blocks 730 of the charging base 700. The buffers/demodulator amplifier blocks 730 may be coupled to induction coils 735. Any ornaments to be charged may comprise respective induction coils and may be charged through a wireless induction charging using the respective induction coils. The μCU 715 may be coupled to an HMI button 730 to control power supplied to the buffers/demodulator amplifier blocks 730 (and thus control brightness of any ornaments inductively coupled to the induction coils 735). The serial I/O interface (modulator) 725 may be an RF transistor in a common emitter open collector configuration and may be coupled to the generator 710 through a pull-up resistor. The voltage-signal may be provided to the buffers/demodulator amplifier blocks 730. Each block 730 may correspond to an ornament position on the base. Each of the blocks may also comprise a transistor in an open collector configuration to allow the transmission of data from the ornaments to the base. Each induction coil pair (one from the base and one from the ornament) may function as a power supply of each ornament.

Figure 8:
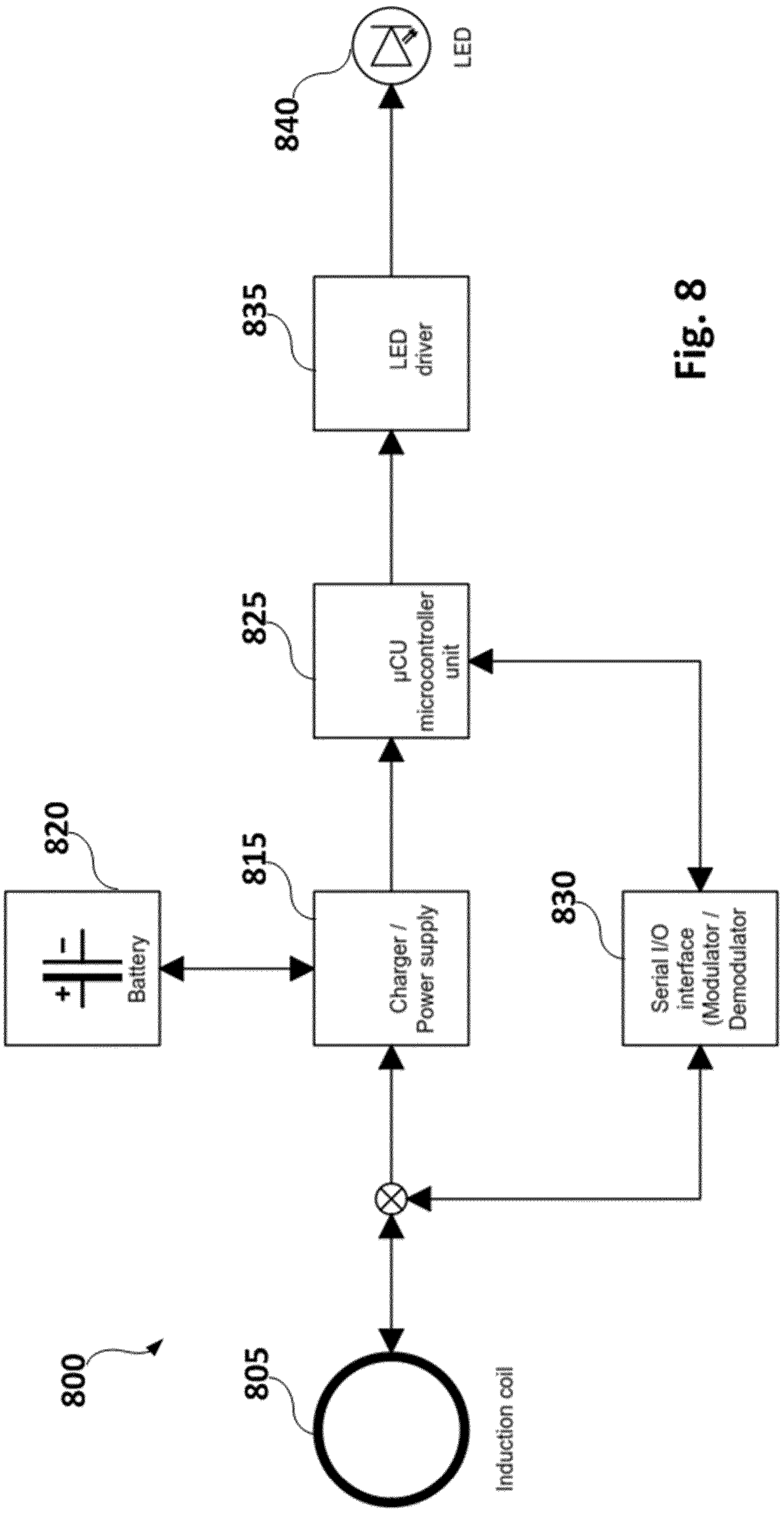
FIG. 8 schematically illustrates an electrical diagram of a wirelessly rechargeable illuminating personal ornament according to an example.

FIG. 8 schematically illustrates an electrical diagram of a wirelessly rechargeable illuminating personal ornament according to an example. Personal ornament 800 may comprise an induction coil 805. The induction coil 805 may be inductively connectable to an induction coil of the base, e.g. induction coil 735 of FIG. 7. The personal ornament 800 may further comprise a charger/power supply block 815. The charger may be coupled to the induction coil 805 and to a battery 820. A microcontroller (μCU) 825 may be coupled to the charger 815. A serial I/O interface 830 may be coupled to the μCU 825 and to the output of the induction coil 805. When the ornament is inductively coupled to induction coil 730 of the base, then the block 815 may act as a charger to charge the battery 820. When the ornament is uncoupled from the induction coil 730 of the base then the block 815 may act as a power supply to the μCU 825 receiving power from the battery 820. The μCU 825 may provide power (either from the power source or from the battery 820) to a LED driver 835 of the ornament 800 and the LED driver 835 may power a LED 840 of the ornament 800.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A luminaire having a plurality of lighting elements for producing light, the luminaire comprising:

a charging base having a base platform, a post connected to the base platform, a plurality of branches each having one edge connected to the post and another edge having a power connector, and a power cable connectable to an external power source and to the power connectors of the plurality of branches for providing power to the power connectors; and a plurality of wearable rechargeable illuminating personal ornaments connectable with the charging base to form the luminaire, each of the plurality of wearable rechargeable illuminating personal ornaments being configured for removable connection to respective ones of the plurality of branches of the charging base to charge the plurality of wearable rechargeable illuminating personal ornaments while the plurality of wearable rechargeable illuminating personal ornaments produce light as the lighting elements of the luminaire, the plurality of wearable rechargeable illuminating personal ornaments being further configured to be worn by a user as illuminating personal ornaments when the plurality of wearable rechargeable illuminating personal is ornaments are disconnected from the charging base in a charged state and do not produce light as the lighting elements of the luminaire, each of the plurality of wearable rechargeable illuminating personal ornaments having:

a shell, a light source attached to the shell, a rechargeable power source located in the shell and connected to the light source, and a power connector coupled to the rechargeable power source and configured for connection to any one of the power connectors of the plurality of branches of the charging base to provide power to the wearable rechargeable illuminating personal ornament so that the wearable rechargeable illuminating personal ornament is charged while producing light as one of the lighting elements of the luminaire.

2. The luminaire according to claim 1, further comprising a power button.

3. The luminaire according to claim 2, wherein the power button is on at least one of the plurality of wearable rechargeable illuminating personal ornaments.

4. The luminaire according to claim 2, wherein the power button is on the charging base.

5. The luminaire according to claim 1, wherein the charging base comprises a plurality of charging points, each charging point comprising the power connector for receiving the corresponding power connector of each of the plurality of wearable rechargeable illuminating personal ornaments.

6. The luminaire according to claim 1, wherein the rechargeable power source comprises a rechargeable battery.

7. The luminaire according to claim 1, wherein the rechargeable battery comprises a lithium-ion battery.

8. The luminaire according to claim 1, wherein each of the wearable rechargeable illuminating personal ornaments comprises one or more of a brooch, a ring, a necklace, an earring, a pendant and a bracelet configured to be worn by the user when the wearable rechargeable illuminating personal ornament is disconnected from the charging base in the charged state.

9. The luminaire according to claim 1, wherein the light source comprises one or more light emitting diodes (LEDs).

10. The luminaire according to claim 1, wherein the power connector is a Universal Serial Bus (USB) connector.

11. The luminaire according to claim 10, wherein the power connector is a USB plug connector and the corresponding power connector is a USB receptacle connector or vice versa.

12. The luminaire according to claim 1, wherein the luminaire is a desk luminaire.

13. The luminaire according to claim 1, wherein:

each of the plurality of wearable rechargeable illuminating ornaments has a microcontroller configured to provide a controlling function so that power from the external power source is provided to the light source to enable the wearable rechargeable illuminating personal ornament to be used as a lighting element of the luminaire to produce light while the wearable rechargeable illuminating personal ornament is connected to the charging base; and the microcontroller is further configured to provide a controlling function so that power from the rechargeable power source is provided to the light source during use of the wearable rechargeable illuminating personal ornament by the user when the wearable rechargeable illuminating personal ornament is disconnected from the charging base.

14. The luminaire according to claim 1, wherein each of the plurality of wearable rechargeable illuminating personal ornaments comprises a power supply coupled to the rechargeable power source and to a microcontroller configured to power the light source, whereby when the wearable rechargeable illuminating personal ornament is connected to the charging base and not being worn by the user, the power supply charges the rechargeable power source, and when the wearable rechargeable illuminating personal ornament is disconnected from the charging base and is being worn by the user, the power supply receives power from the rechargeable power source to provide power to the microcontroller to power the light source.

15. The luminaire according to claim 14, wherein each of the plurality of wearable rechargeable illuminating personal comprises an induction coil inductively connectable to a corresponding induction coil of the charging base, and wherein the power supply charges the rechargeable power source when the wearable rechargeable illuminating personal ornament is inductively coupled to the induction coil of the charging base.

16. The luminaire according to claim 15, further comprising a serial Input-Output interface, coupled at one end to an output of the induction coil of the wearable rechargeable illuminating personal ornament and at another end to the microcontroller, to control the power from the power supply so that when the wearable rechargeable illuminating personal ornament is inductively coupled to the induction coil of the base, then the power supply charges the rechargeable power source and the microcontroller powers the light source from power received through the serial I/O interface, and so that when the wearable rechargeable illuminating personal ornament is uncoupled from the induction coil of the base then the microcontroller, not receiving any power from the Serial I/O interface, receives power from the power supply which in turn receives power from the rechargeable power source.

17. A rechargeable illuminating personal ornament for a luminaire according to claim 1.

18. A luminaire having a plurality of lighting elements for producing light, the luminaire comprising:

a charging base comprising a base platform, a post connected to the base platform, a plurality of branches each having one edge connected to the post and another edge having a power connector, and a power cable connectable to an external power source and to the power connector of each of the plurality of branches; and a plurality of wearable rechargeable illuminating personal ornaments configured for connection to the charging base to charge the plurality of wearable rechargeable illuminating personal ornaments and to produce light as the lighting elements of the luminaire, the plurality of wearable rechargeable illuminating personal ornaments being further configured to be worn by a user and produce light while being worn by the user in a state in which the plurality of wearable rechargeable illuminating personal ornaments are disconnected from the charging base in a charged state and do not produce light as the lighting elements of the luminaire, each of the plurality of wearable rechargeable illuminating personal ornaments comprising:

a light source for producing light, a rechargeable power source connected to the light source, and a power connector coupled to the rechargeable power source and configured for connection to any one of the power connectors of the plurality of branches of the charging base to provide power to the wearable rechargeable illuminating personal ornament so that the wearable rechargeable illuminating personal ornament is charged while producing light as one of the lighting elements of the luminaire.

19. The luminaire according to claim 18, wherein each of the wearable rechargeable illuminating personal ornaments is in the form of an earring configured to be worn on an ear of the user when the power connector of the wearable rechargeable illuminating personal ornament is disconnected from the corresponding one of the power connectors of the plurality of branches of the charging base and the wearable rechargeable illuminating personal ornament is in a charged state.

20. The luminaire according to claim 18, Wherein each of the plurality of wearable rechargeable illuminating personal ornaments further comprises a shell having a cavity; and wherein for each of the plurality of wearable rechargeable illuminating personal ornaments, the light source is provided in the cavity of the shell.

21. The according to claim 18, wherein each of the plurality of wearable rechargeable illuminating personal ornaments comprises a microcontroller configured to provide a controlling function so that when the wearable rechargeable illuminating personal ornament is not being worn by the user, power from the external power source is provided to the light source to enable the wearable rechargeable illuminating personal ornament to be used as a lighting element of the luminaire to produce light when the power connector of the wearable rechargeable illuminating personal ornament receives power from the corresponding power connector of the charging base; and wherein the microcontroller is further configured to provide a controlling function so that power from the rechargeable power source is provided to the light source when the wearable rechargeable illuminating personal ornament is not being charged by the charging base and is being worn by the user as an illuminating personal ornament.

22. A luminaire, comprising:

at least one wearable rechargeable illuminating personal ornament having a shell, a light source attached to the shell, a rechargeable power source located in the shell and connected to the light source, and a power connector coupled to the rechargeable power source; and a charging base having a base platform, a post connected to the base platform, a plurality of branches each having one edge connected to the post and another edge provided with a charging station comprising a power connector configured for connection to the power connector of the at least one wearable rechargeable illuminating personal ornament for charging the at least one wearable rechargeable illuminating personal ornament, and a power cable configured for connection to an external power source and to the power connector of each charging station to provide power to the power connector of the at least one wearable rechargeable illuminating personal ornament;

wherein when not being charged by the charging base, the at least one wearable rechargeable illuminating personal ornament is configured (a) to be removed from the charging base by disconnecting the power connector of the at least one wearable rechargeable illuminating personal ornament from the power connector of the corresponding charging station and (b) to be worn by a user as an illuminating personal ornament; and wherein when not being worn by the user as the illuminating personal ornament, the at least one wearable rechargeable illuminating personal ornament is configured for placement on the charging base by connecting the power connector of the at least one wearable rechargeable illuminating personal ornament to the power connector of any one of the charging stations of the charging base so that the at least one wearable rechargeable illuminating personal ornament functions as a lighting element of the luminaire to produce light for the luminaire while the at least one wearable rechargeable illuminating personal ornament is being charged by the charging station of the charging base.

23. The luminaire according to claim 22, wherein:

the at least one wearable rechargeable illuminating personal ornament has a microcontroller configured to provide a controlling function so that when the at least one wearable rechargeable illuminating personal ornament is placed on the charging base and not being worn by the user, power from the external power source is provided to the light source to enable the at least one wearable rechargeable illuminating personal ornament to function as the lighting element of the luminaire to produce light for the luminaire while the at least one wearable rechargeable illuminating personal ornament is being charged by the charging station of the charging base; and the microcontroller is further configured to provide a controlling function so that power from the rechargeable power source is provided to the light source when the at least one wearable rechargeable illuminating personal ornament is not being charged by the charging base and is being worn by the user as an illuminating personal ornament.

* * * * *